INVENTOR.
ORVILLE G. YARNELL
BY
ATTORNEY

United States Patent Office 3,428,382
Patented Feb. 18, 1969

3,428,382
RETRACTABLE TYPEWRITER SUPPORT FOR DESKS
Orville G. Yarnell, 1901 Orme Court,
Wichita, Kans. 67211
Filed Apr. 6, 1967, Ser. No. 628,917
U.S. Cl. 312—208                                 17 Claims
Int. Cl. A47b 21/03

ABSTRACT OF THE DISCLOSURE

The present invention relates to a typewriter support asesembly adapted to be mounted in a desk, such assembly including a support guided for movement between a lower retracted position and an upper forward operative position with the support slidably carrying an extensible typewriter support leaf. The support can be selectively held in and released from an operative position by appropriate movement thereof as guided along its guided travel path. In one form of the invention such selectivity is accomplished by guide channels having a horizontal or downwardly and forwardly inclined upper end portions. Two alternative structures for such selectivity each affords a choice of a plurality of height positions for the operative location of the support and each of these structures involves a ratchet means which includes means for rendering the same inoperative after the support is moved to a predetermined upper position and until the support has been fully lowered.

---

The present invention relates to new and useful improvements in retractable support apparatus such as disclosed in my copending application for United States Letters Patent bearing application Ser. No. 460,142 that was filed June 1, 1965, and which is entitled, Retractable Support Apparatus.

More particularly this invention relates to apparatus especially suited to support a typewriter selectively in an operative position for use thereof and in a retracted or inoperative storage position.

The disclosure of my previously mentioned pending application is incorporated herein by reference.

The primary objective of this invention is to provide a support movable along a defined path between positions vertically and horizontally displaced from each other, and wherein prescribed manipulations of the support along such path will serve selectively to secure the support against downward movement from a location disposed adjacent the uppermost of said positions and to release the support for descent from such location to the lowermost of said positions.

Another important object is to provide in a more sophisticated version of the invention apparatus according to the preceding object wherein the support can be manipulated to selectively secure the support at and release the support from a plurality of locations having differing heights and with respect to the lowermost of said positions.

Another object of the invention is to provide apparatus suitable for sale as a subassembly to be simply and readily assembled by the purchaser thereof with conventional or extant desks or tables, whether such purchaser be a typewriter desk manufacturer or the ultimate user of the assembly.

Another object of the invention is to provide in accordance with the preceding objects, apparatus of economic and simple construction which will be durable and reliable in use.

Broadly, the present invention involves retractable support apparatus comprising a generally rectangular support in a horizontal attitude and having opposite sides and front and rear ends, said support being movable and provided with means at its opposite sides that are adapted to be secured to a desk for defining a path and guiding movement of said support along such path intermediate first and second locations while maintaining the support in a horizontal attitude, said second location being higher and forward of said first location, said path being of a limited extent and having opposite ends corresponding to the first and second locations of the support, means selectively operable in response to predetermined positioning movements of the support along the path to prevent gravitational movement of the support along said path from adjacent said second location toward the first location.

One aspect of the invention broadly set forth in the preceding paragraph involves the last mentioned means comprising said path being free of any downwardly and rearwardly inclination along an extent thereof corresponding to the support being relatively nearer its second location as compared to its first location.

Still another aspect of the invention broadly set forth in the next to last preceding paragraph involves the means selectively operable to prevent gravitational movement of the support comprising releasable strut means having first and second ends respectively provided with first and second connecting means, said first connecting means operatively connecting the strut means to the support, said second connecting means being adapted to be secured to a desk at a position below and to the rear of the first connecting means when the support is in its second location, one of said connecting means including a pivot having a horizontal and laterally extending axis about which the strut means swings, and the other of said connecting means comprising first and second means movable relative to each other in first and second directions in response, respectively, to movement of the support along said path towards and away from the second location thereof, said first means comprising a securing element, said second means defining a guide path for the securing element that includes vertically spaced first and second portions each of which is approximately parallel to the direction of relative movement of the first and second means, with said first and second portions of the guide path each having first and second ends respectively connecting with each other, said second means also including means for preventing relative movement of the securing element in said second direction along the first portion of the guide path.

Yet another important aspect of the invention broadly set forth in the third preceding paragraph involves the means selectively operable to prevent gravitational movement comprising ratchet means including an elongated toothed member adapted to be fixed to a desk, said toothed member including a series of spaced teeth each of which is successively disposed in a fixed predetermined relation to the support upon the support being incrementally moved along its path from the first position to the second position thereof, said ratchet means also including a ratchet element movably mounted on the support for movement into and out of ratchet engagement with the teeth, the arrangement being such that the ratchet element will unidirectionally ratchet freely and sequentially over the teeth of the toothed member on movement of the support along its path from the first position to the second position thereof, whereby the support can be selectively secured against movement at selected positions in a direction from its second position toward its first position, and means responsive to the support being moved a predetermined extent toward its second position to cause the ratchet element to bypass all the teeth on subsequent movement of the support toward its first position.

An important feature of one embodiment of the invention resides in the provision of inclined guides which at their upper ends include short reversely inclined or horizontal extents such that the guides can support the support structure.

An important feature of another embodiment of the invention resides in the provision of a strut structure selectively operable by manipulation of the support to prop the support in its operative position and to release the support so that the latter may be lowered to its retracted position. This feature is such as to enable a selection of propped positions of the support and can be employed whether the support is constrained to its travel path by parallel pivotal links or by fixed guide means secured to the desk.

An important feature of yet another embodiment of the invention comprises ratchet means including an elongated toothed member parallel to an inclined guide channel.

Other objects, aspects, features and advantages will become evident during the ensuing description of preferred embodiments of the invention, such description to be taken in conjunction with the accompanying drawings, wherein.

Figures 1, 2, 3:
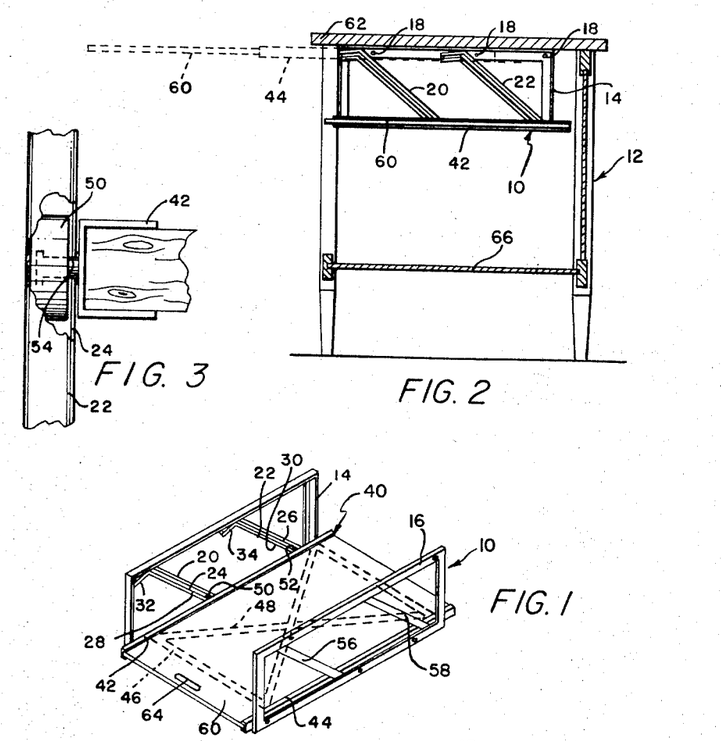
FIGURE 1 is an isometric view of a support assembly adapted for mounting in the well of a desk or mounted on a table beneath the top thereof.
FIGURE 2 is a vertical sectional view on a reduced scale of a desk having the assembly shown in FIGURE 1 mounted in the well thereof, the support of the assembly being shown in its retracted position in full lines, and in dashed lines in its elevated operative position with its slide or leaf extended.
FIGURE 3 is an enlarged fragmentary detail view of the apparatus shown in FIGURES 1 and 2, with portions broken away and hidden parts shown in dashed outline, illustrating the relationship of rollers on the support and the guide channel therefor.
Figure 4:
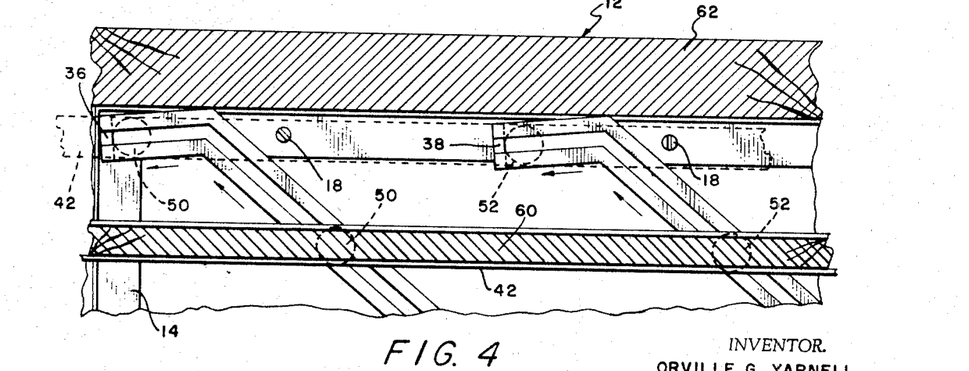
FIGURE 4 is an enlarged fragmentary vertical sectional view illustrating the support in full lines at an intermediate position along its guided path and showing in dashed lines the position occupied thereby when in its elevated operative position.

Referring now to the drawings wherein like numerals designate like parts throughout the various views, and giving initial attention to the embodiment of the invention shown in FIGURES 1 through 4, the reference numeral 10 designates generally support apparatus suitable for mounting in the well of a conventional desk such as indicated at 12 in FIGURE 2 so as to constitute a subcombination of a typewriter or secretary-type desk. It will be understood that the support apparatus 12 is disposed in the space or volume normally or customarily provided in secretary-type desks for typewriter storage.

The support apparatus 10 comprises a pair of open rectangular frames 14 and 16, such frames 14 and 16 being preferably of metallic construction. The frames 14 and 16 are in horizontally spaced parallelism to each other, are vertically arranged, and are fixedly secured by any suitable means such as the fasteners indicated at 18 to the desk 12, it being understood both the frames 14 and 16 are so secured.

Each of the frames 14 and 16 is provided with guide means, and since each of such frames 14 and 16 as well as the guide means fixed thereto are mirror images of each other, a detailed description of the guide means provided in connection with the frame 14 will suffice for both.

The guide means provided for the frame 14 comprises a pair of guide channels 20 and 22 fixedly secured by welding or the like to the frame 14. The guide channels 20 and 22 are identical to each other and are in parallelism with each other with a fore and aft spacing relative to the frame 14. The guide channels 20 and 22 are C-shaped in transverse section so as to present or have slots therein opening into the hollow interior thereof from the side of the guide channel facing toward the space between the frames 14 and 16, such slots being indicated at 24 and 26, respectively.

The guide channels 20 and 22 include upwardly and forwardly inclined straight portions 28 and 30, respectively, that are of relatively short extent. The forward ends of the guide channel portions 32 and 34 are closed as indicated at 36 and 38.

A support structure 40 is provided which includes spaced parallel side members 42 and 44, the lower edges of the side members 42 and 44 being interconnected by cross members and cross braces shown in dashed lines at 46 and 48 in FIGURE 1, whereby the side members 42 and 44 are held in fixed relationship to each other.

The parallel side members 42 and 44 are disposed in a horizontal plane, and are provided with elements arranged for operative guided relationship with respect to the previously described guide channels 20 and 22 of both the frames 14 and 16. Such elements comprise, in relationship to the guides 20 and 22 of the frame 14, a pair of rollers 50 and 52 received within the hollow guide channels 20 and 22, and such rollers are mounted (see FIGURE 3 in relation to the roller 50, the guide channel 20 and the side member 42) are rotatably mounted upon axles 54 that extend through the slots 24 and 26 and which are secured to the side member 42.

The guide channels of the frame 16 corresponding to the guide channels 20 and 22 of the frame 14 are indicated at 56 and 58. It will be understood that the side member 44 is provided with guide rollers corresponding to the previously described guide rollers 50 and 52. The spacing of the side members 42 and 44 is somewhat closer than the spacing of the frames 14 and 16 so as to provide free running clearance of the support structure 40 between the frames 14 and 16.

The lower ends of the guide channels 20, 22, 56 and 58 are closed so as to limit downward travel of the rollers 50 and 52 at both sides of the support structure 40, and therefore the downward movement of the support structure 40 is limited. The arrangement is such that while the support structure 40 is at all times maintained in a horizontal attitude, a travel path therefor is defined which is such that the support structure 40 moves upwardly and forwardly from its lowermost limited position, and thence a short interval forwardly and downwardly, with further forward and downward movement being prevented by the previously described stops 36 and 38. In order to be returned to its initial starting position, the support structure 40 must be pushed rearwardly and upwardly until the rollers have passed the bight extents of the guide means, after which the support structure 40 is free to descend by virtue of its own weight to its initial lowermost position. The essential characteristic of this invention is that when the support structure 40 is in its forwardmost position, the same is not responsive to its own weight to move to its rearmost and lowermost position, but rather to simply move against the previously described stops 36 and 38. An inherent characteristic of the structure shown in FIGURES 1 through 4 is that a positive lifting force must be applied to the support structure 40 prior to the same being in a position so that it will descend by virtue of its weight to its rearmost and lowermost inoperative or storage position.

In the preferred construction of the embodiment of the invention shown in FIGURES 1 through 4, the side members 42 and 44 are preferably channel shaped and in facing relationship, as will be apparent upon inspection of FIGURES 1 and 3, and a rectangular slide or typewriter supporting leaf 60 is slidingly received within the opposed channels constituted of the side members 42 and 44. The arrangement is such that when the side members 42 and 44 have been raised to their most forward position (the rollers 50 and 52 engaging the stops 36 and 38) shown in dashed outline in FIGURE 2, the slide 60 can be further forwardly extended as also shown in dashed outline in FIGURE 2. It will be understood that the slide or leaf 60 can be extended or retracted whether the support structure 40 is in its lowermost or in its uppermost position. Normally it is preferred that the slide 60 be in its extended position throughout the time that the support structure 40 is disposed upwardly of its lowermost position for the reason that a typewriter or the like (not shown) can be placed upon the slide 60 and not be caused to come into engagement with the top 62 of the desk 12. By way of further explanation, a typewriter resting upon the leaf 60 with the latter being in the dashed line position shown thereof in FIGURE 2 would not come into contact with the desk top 62 during the lowering of the support structure 40 provided the slide 60 was kept in an extended position from the side members 42 and 44. During the lowering of the support structure 40 to its lowermost position, the slide 60 will have been lowered in its height by an amount sufficient to afford clearance between the top of the typewriter and the top 62 of the desk 12 on the slide 60 and the typewriter supported thereby being pushed into their retracted positions within the desk 12 and the side members 42 and 44.

From the foregoing, it is believed that the operation of the embodiment shown in FIGURES 1 through 4 will be fully understood. It is preferred that the structure shown in FIGURE 1 be entirely metallic excepting the slide or leaf 60 which can be wood as shown and provided with an indentation or groove such as shown at 64 to facilitate manipulation of the same, and excepting the rollers 50 and 52, which can be of metallic construction, but it is preferred that such wheels or rollers 50 and 52 be of a synthetic resin material possessing good antifriction characteristics such as nylon or the like. It will be understood that the rollers or wheels 50 and 52 will have diameters slightly less than the internal dimension of the guide channels accommodating the same.

An important advantage of the embodiment of the invention shown in FIGURES 1 through 4 resides in the overall vertical height of the structure shown in FIGURE 1 being minimized, it only being necessary that the frames 14 and 16 have a vertical extent slightly in excess of the vertical height of the typewriter to be supported by the subassembly, thereby enabling optimum use and maximization of the volume within the desk 12 intermediate the bottom of the subassembly 10 and the bottom 66 of the desk 12. Also, the subassembly 10 is extremely simple in its construction so as to make for economic manufacture, and ease of assembly with other components of the desk 12. For obvious reasons it is highly preferred that the guide channel portions 32 and 34 be forwardly and downwardly inclined, such portions of the guide channels can be horizontal and yet, though in an arrangement relatively very unstable, prevent the downward movement of the support structure 40.

Means, not shown, of conventional character are provided to limit extension of the slide 60 from the side members 42 and 44. Although not shown in the drawings, spring means such as disclosed in an embodiment of the invention yet to be described can be employed in the embodiment of the invention described above to counteract to a predetermined partial extent the weight of the support structure 40 and the typewriter carried thereby.

Attention is now directed to another embodiment of the invention, wherein a different form of means is provided for preventing descent of the support structure from its extended upper operative position. Accordingly, directing attention to the embodiment of the invention shown in FIGURES 5 through 9, reference numeral 70 designates generally the modified support subassembly for use with a conventional desk such as designated generally at 72, the latter including support legs 74, horizontal frame members 76, a desk top 78 and a bottom wall 80 spaced below the desk top 78 and above the lowermost extent of the legs 74; all in accordance with conventional secretary-type desk construction. Also in accordance with conventional desk construction, the desk 72 includes vertical walls or partitions forming a rigid part of the desk, such partitions or walls being disposed at opposite sides of the usual typewriter storage space, and such partitions or walls are indicated at 82 and 84. As in the case of the previously described embodiment of the invention, the desk 72 can be of wooden or metallic construction. Indeed, a great deal of latitude exists with respect to all the embodiments of the present invention with respect to the character of the desk or table construction employed, it only being essential that the same provide support for the subassemblies actually constituting the subject matter of this invention in and of themselves as subassemblies and in combination with supporting table or desk structure.

The support subassembly 70 comprises a pair of open rectangular frames 86 and 88 which are vertically arranged in parallelism and respectively fixed or mounted by any suitable means to the partitions or walls 82 and 84, respectively. Each of the frames 86 and 88 have fixedly secured thereto guide means, and inasmuch as each of such guide means are identical to each other, that is, mirror images of each other, a description of such guide means provided for the frame 86 will provide for both.

The guide means provided for the frame 86 comprises three parallel guide channels 90, 92 and 94 that are straight and which are forwardly and upwardly inclined as shown. The upper and lower ends of each of the hollow guide channels 90, 92 and 94 are closed so as to limit movement of the hereinafter described guided elements disposed therein. Each of the channel guides 90, 92 and 94 have cross sections generally similar to the previously described guide channels of the embodiment of the invention shown in FIGURES 1 through 4, that is, the guide channels are generally C-shaped in cross section and are of generally rectangular configuration, having slots 96, 98 and 100, respectively, in the sides thereof facing toward the space intervening between the frames 86 and 88.

Figures 5, 9:
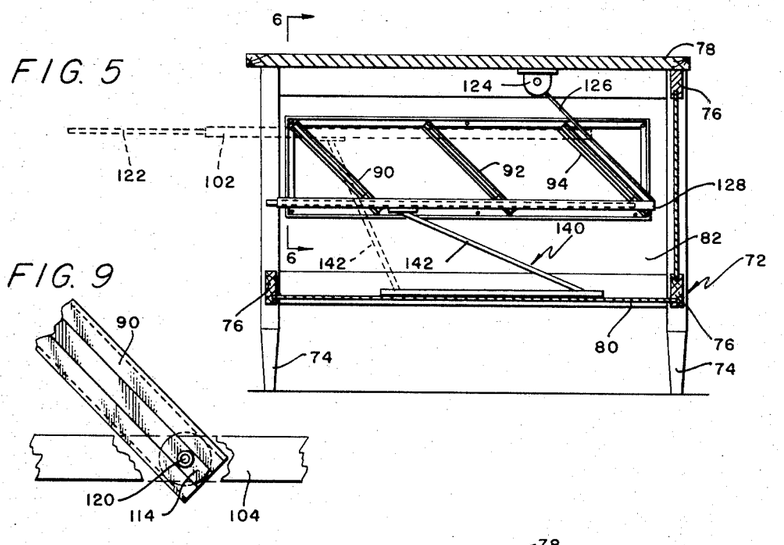
FIGURE 5 is a vertical sectional view in the front to rear plane through a desk provided with another embodiment of support apparatus, this view showing the support at its retracted position in full lines and at its extended position in dashed outline.
FIGURE 9 is an enlarged fragmentary detail view of the guide means employed in the embodiment of the invention shown in FIGURES 5 through 8.

A rigid horizontal support frame 102 is provided which includes spaced side members 104 and 106, and the frame side members 104 and 106 are provided at spaced positions along their edges with means adapted to be in guided relationship with the guide channels 90, 92 and 94 as well as with the corresponding guide channels 108, 110 and 112 fixed to the frame 88. Inasmuch as the guided elements associated with the side members 104 and 106 are similar, a description of such elements provided in association with the side member 104 will suffice for both. Such guided elements provided in association with the side member 104 comprises rollers or wheels 114, 116 and 118 mounted for rotation on the side member 104, such rollers or wheels being operatively associated with the guide channels 90, 92 and 94, respectively. As shown in FIGURE 9 in relation to the roller or wheel 114 and its relationship to the guide channel 90 and the side member 104, the rollers 114, 116 and 118 are rotatably disposed within their respective guide channels 90, 92 and 94 (having slightly less diameters than the corresponding internal dimensions of their respective guide channels), and are rotatably mounted upon stub axles 120 fixedly secured to the side member 104.

Figure 8:
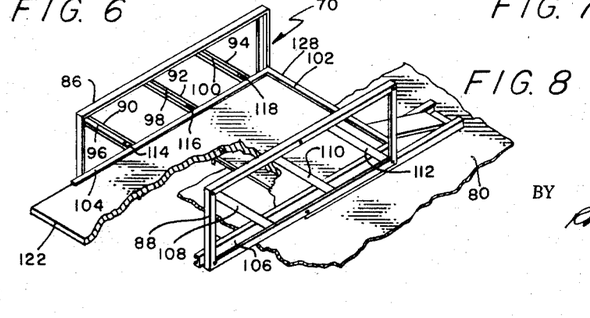
FIGURE 8 is a fragmentary isometric view on an enlarged scale of the support assembly and a portion of the desk to which it is attached as a subassembly.

Accordingly, the support frame 102 is maintained in a horizontal attitude and is guided for limited movement along a path inclined upwardly and forwardly from the lowermost position thereof shown in FIGURE 8.

As in the case of the previously described embodiment of the invention, the side members 104 and 106 are of channel configuration and slidably receive a slide or leaf 122 therein, means being provided to limit extension of the slide 122 from its retracted position shown in FIGURE 8, not shown.

Means is provided for yieldingly urging the support frame 102 upwardly and forwardly along its inclined previously described path. Such means comprises a conventional coiled spring means 124 secured to the underside of the desk top 78, such spring means 124 being of conventional character and including a flexible tension element 126 that is extensible from a coiled or wound condition within the means 124, and such tension element 126 being secured to a cross member 128 at the rear of the support frame 102. It is preferred that the resilient means 124 be of the type wherein the tension produced in the tension element 126 is substantially constant or relatively free or independent of magnitude with respect to the extent of the element 126 is extended therefrom. It will be understood that the spring means 124 produces a tension in the element 126 sufficient to counteract in substantial measure, but not exceed the amount of force necessary to raise the support frame 102 and a typewriter or the like, not shown, resting thereon from the lowermost position of the frame 102 shown in full lines in FIGURE 5.

The means provided for selectively preventing gravitation of the support frame 102 from the position shown thereof in dashed outline in FIGURE 5 to the full line position shown thereof in FIGURE 5 is such that selectivity is obtained through suitable manipulation of the frame 102 along its travel path, and such selectivity extends to selection of the height of the position in which the frame 102 is held against gravitational movement downward.

The means mentioned in the last paragraph is designated generally at 140, and the means 140 comprises a strut or prop 142 that is elongated and operatively associated at its opposite ends with the support frame 102 and structure mounted on the bottom wall 80 of the desk 72. The strut 142 in transverse section is in the form of a channel comprised of a web portion 144 and relatively short depending legs 146 and 148 connected by the web portion 144.

An inverted U-shaped mounting bracket 150 is fixedly secured by suitable means to the support frame 102, the arrangement being such that the mounting bracket 150 remains fixed with respect to the support frame 102 and does not interfere with sliding movement of the slide or leaf 122 relative to the support frame 102. A pivot pin 152 is carried horizontally by the mounting bracket 150, such pivot pin extending through the legs 146 and 148 of the strut 142 adjacent the upper end of the latter, whereby the strut 142 is pivotally connected to the support frame 102 for oscillatory movement about a horizontal axis that is perpendicular to the fore and aft extent of the subassembly 70.

A latch rod 154 extends through the legs 146 and 148 of the strut 142 adjacent the lower end of the latter, the latch rod 154 being parallel to the previously described pivot pin 152. The latch rod 154 is fixedly secured to the strut 142 and has a length so as to project laterally from the opposite sides of the lateral extent of the strut 142.

A latchkeeper construction designated generally at 156 is provided, such latchkeeper construction being such as to be fixedly secured to the bottom wall 80 of the desk 72. The latchkeeper construction 156 comprises an elongated housing portion 158 that is C-shaped in transverse section and which includes a web portion 160, upstanding legs 162 and 164, and the upper ends of the legs being respectively provided with inturned margins 166 and 168. An elongated inner member 170 is nested within the outer member 158, the inner member 170 being channel-shaped and including a web portion 172 having upstanding legs 174 and 176 along its lateral edges, the upstanding legs 174 and 176 having a lesser height and being spaced inwardly from the previously described legs 162 and 164 of the outer member 158. The web portions 160 and 172 are seated flush against each other and are jointly secured to the bottom wall 80 by means of fasteners 178 extending through such web portions as will be understood.

The ends of the upstanding legs 174 and 176 nearest the front of the latching structure 156 are provided with aligned pairs of spaced notches such as those indicated at 180, 182 and 184. The edges of the notches 180, 182 and 184 nearest the front of the latch structure 156 are of shallow slope, while the edges nearest the rear end of the latching structure 156 are of steep slope, and such slope may be vertical as shown, or even of greater slope if desired so that the notches are in effect undercut in the legs 174 and 176, as will be understood. The opposite end portions of the latch rod 154 project over the upper edges of the legs 174 and 176, the arrangement being such that the opposite end portions of the latch rod 154 can be received in the notches 180, 182 and 184, it being understood that the inturned flanges 166 and 168 overlie the opposite end extremities of the latch rod 154 to prevent vertical displacement of the rod 154 from at least close proximity to the upper edges of the upstanding legs 174 and 176.

Figures 10, 11:
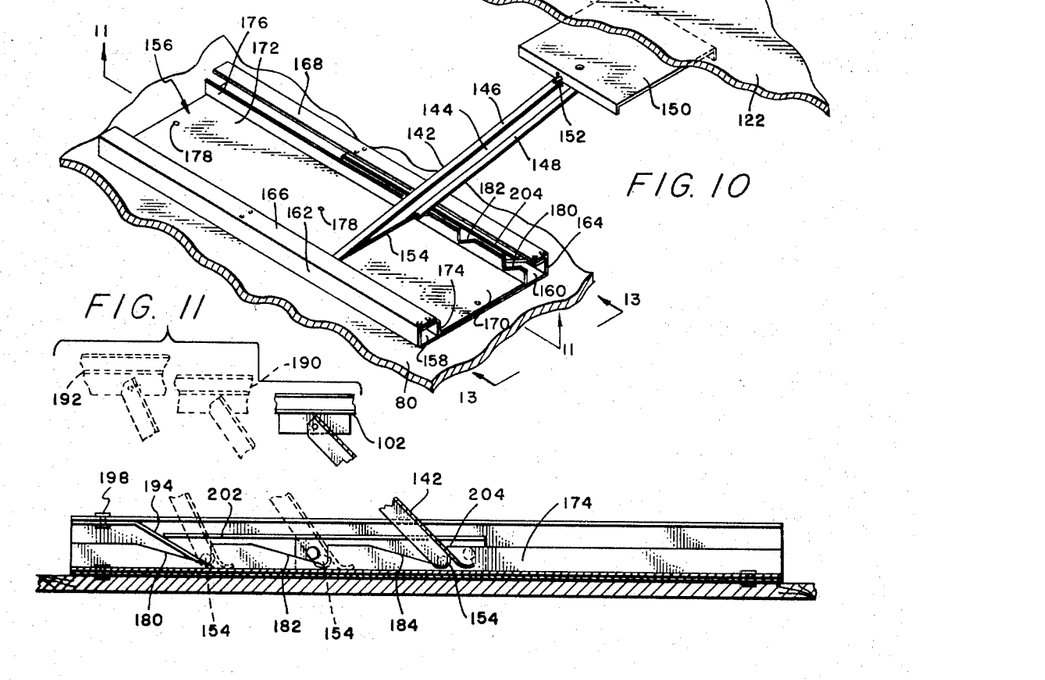
FIGURE 10 is an enlarged fragmentary isometric view illustrating the propping or strut means, the latter being shown in one of its propping conditions.
FIGURE 11 is an enlarged and broken vertical sectional view, taken upon the plane of section line 11—11 in FIGURE 10, further illustrative of the propping means shown in FIGURE 10, with alternate positions of the propping strut and the support being fragmentarily shown in dashed outline.

On consideration of FIGURE 5, it will be evident that as the support frame 102 is moved from the full line position shown thereof towards the dotted line position shown thereof, the lower end of the strut 142 will be caused to move forwardly along the latching structure 156 from the full line position shown thereof toward the dotted line position shown thereof, and during the course of such forward movement of the lower end of the strut 142, the opposite end portions of the latch rod 154 will slide along the upper edges of the legs 174 and 176, and eventually pass sequentially over the notches 184, 182 and 180 in such order; however, if after having passed over any one of such notches, the support frame 102 is caused to move downwardly along its travel path the latch rod 154 will become engaged in the last of the notches to be crossed thereby, and such engagement of the latch rod in such notch will prevent any further rearward movement of the lower end of the strut 142, and thereby prevent any further downward movement of the support frame 102. Accordingly, as thus far described, the support frame 102 can be selectively propped, depending upon how far the same is initially raised, at any selected one of three heights corresponding to the latch rod 154 becoming engaged in the notches 184, 182 and 180. This selectivity is clearly apparent upon noting the vertical height of the support frame 102 shown in full lines in FIGURE 11, such full line position corresponding to the latch rod 154 becoming engaged in the notch 184. The vertical positions of the support frame 102 indicated in dashed outlines at 190 and 192 correspond respectively to the latch bar or rod 154 being engaged in the notches 182 and 180.

Figure 13:
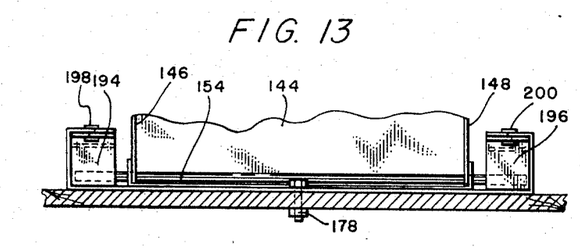
FIGURE 13 is a vertical sectional view taken upon the plane of the section line 13—13 in FIGURE 10.

Means is provided for releasing the latch bar or rod 154 from such notch as within which it may have been engaged for return to the position shown thereof in full line in FIGURE 5, or for engagement with a notch corresponding to a more elevated position of the support frame 102. Such means comprises a pair of inclined straps 194 and 196 disposed respectively in the spaces between the legs 162 and 174 and the legs 164 and 176. The straps 194 and 196 are metallic and of substantial stiffness, and are riveted or otherwise fixedly secured to the marginal portions 166 and 168 as clearly indicated at 198 and 200 in FIGURE 13. The inclined straps or ramps 194 and 196 are inclined forwardly and upwardly and are arranged with respect to the forwardmost pair of notches 180 in such a manner that as soon as the latch rod 154 passes forwardly of a position such that the same can be engaged in the notches 180, the latch rod 154 is cammed forwardly and upwardly. Such forward and upward camming of the latch rod 154 causes the latch rod 154 to engage and resiliently flex and pass by spring fingers 202 and 204 fixed respectively to the legs 162 and 164. The spring fingers 202 and 204 are horizontal and spaced below the marginal portions 166 and 168, and such spring fingers have downturned flanges 206 adjacent their rear ends that are riveted or otherwise fixedly secured to the legs 162 and 164 as indicated at 208.

Figure 12:
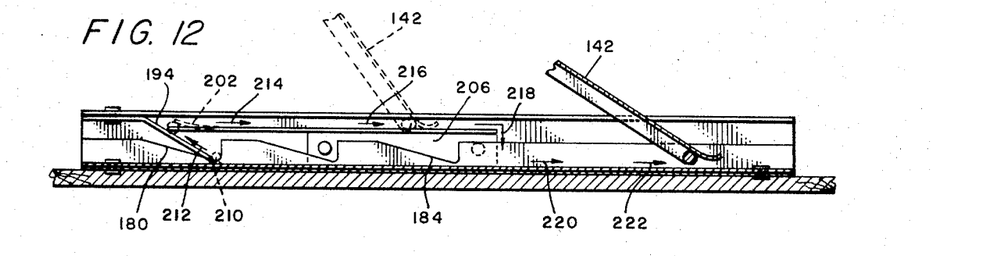
FIGURE 12 is a view similar to FIGURE 11 except showing the strut as being in a released condition, such strut being shown in dashed outline in an intermediate position occupied during its release.

The coaction between the latch rod 154 and the lower end of the strut 142 with the latching means 156 will be best appreciated upon considering FIGURE 12. Assuming the latch rod 154 to be initially in the position indicated thereof in dashed outline at 210, upward movement of the support frame 102 will cause the latch bar 154 to travel upwardly along the inclined ramp 194 as indicated by the arrow 212 and cause the finger 202 to resiliently spring upwardly as indicated in dashed outline, whereby the latch rod 154 will pass to a position above the resilient finger 202, and further upward movement of the support frame will be prevented by engagement of the latch rod 154 with the ramps 194 and 196 and the marginal portions 166 and 168. Subsequent downward movement of the support frame 102 is now possible with the latch rod 154 sliding along on the upper surfaces of the spring fingers 202 and 204 along the path indicated by the arrow 214. The spring fingers 202 and 204 enable the latch bar 154 to move further rearwardly as indicated by the arrow 216 until the same has cleared to the rear of the rearmost notches 184, after which the latch rod 154 clears the rearmost ends of the spring fingers 202 and 204 and thereafter drops as indicated by the arrow 218 to the upper edges of the legs 174 and 176 so as to thereafter move as indicated by the arrows 220 and 222 to the position shown thereof in full lines in FIGURE 5 corresponding to the support frame 102 being fully lowered. It will be noted that the spring fingers 202 and 204 are spaced above the upper edges of the legs 174 and 176 so that such spring fingers do not prevent forward movement of the latch rod 154 so as to become engaged with the notches 184, 182 and 180.

From the foregoing, it will be appreciated that the structure described will enable the user of the apparatus by appropriate manipulation of the support frame 102 along its guided inclined path to selectively engage the strut or prop 142 in a plurality of positions corresponding to selected vertical heights of the support frame 102, and that by further appropriate manipulation of the vertical position of the support frame 102, the user can return the support frame 102 to its fully lowered position.

In the preferred construction, the components of the propping or supporting means is metallic, however, it is deemed well within the skill of the art to make such selection of materials as may be deemed by the user to be appropriate to the loads to be carried thereby.

Attention is now directed to another embodiment of the invention, this embodiment of the invention differing from the embodiment last described solely in the structure provided for guiding and defining the upwardly and forwardly inclined travel path of the support structure. For an appreciation of this embodiment of the invention, reference is made to FIGURES 14 through 17 of the drawings.

This embodiment of the invention comprises a desk designated generally at 230 generally similar to the desks previously described and including a top 232, a bottom 234 and vertical walls or partitions 236 and 238. A support frame 240 is provided generally similar to the previously described support frame 102, and the support frame 240 includes in a similar fashion an extensible slide or leaf 242.

A strut or propping structure 244 is provided, the same being pivotally connected at 246 to the support frame 240 in the same manner as the strut 142 is pivotally connected to the support frame 102 of the embodiment of the invention previously described. Similarly, the lower end of the strut 244 is operatively connected to a latching means 246 fixed to the bottom wall 234, the latching means 246 being the same as the previously described latching means 156.

Figure 14:
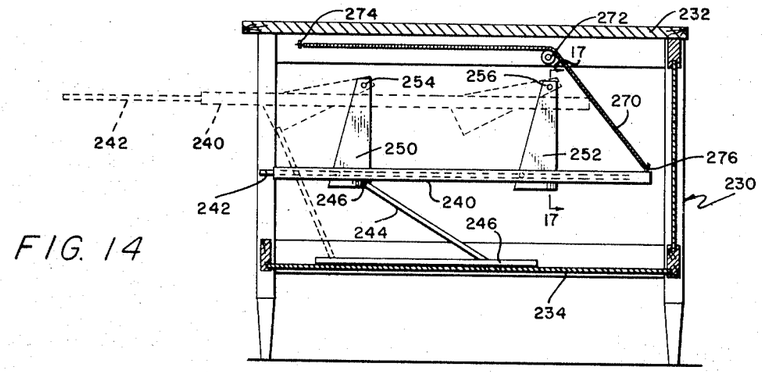
FIGURE 14 is a vertical sectional view taken through a desk, this view showing support apparatus identical to that shown in FIGURE 5 except for the provision of a different embodiment of guide means (alternative positions of the latter being shown in dashed lines) for the support, that is, parallel pivotal links in lieu of fixed guide channels and rollers.
Figure 15:
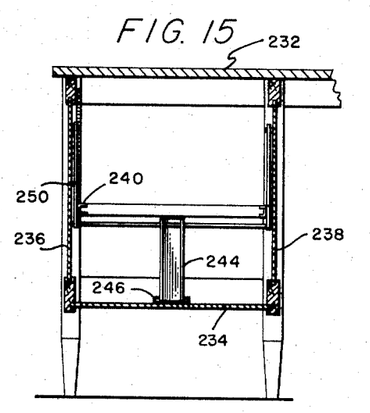
FIGURES 15 and 16 are vertical sectional views of the apparatus shown in FIGURE 14, these views bearing the same relation to FIGURE 14 as FIGURES 6 and 7 bear to FIGURE 5.
Figure 16:
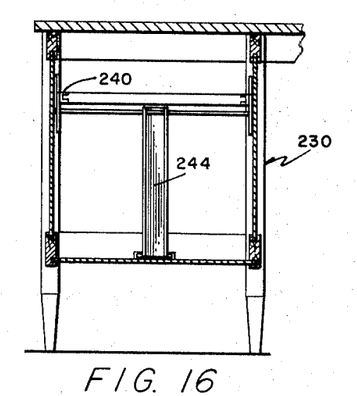
Figure 17:
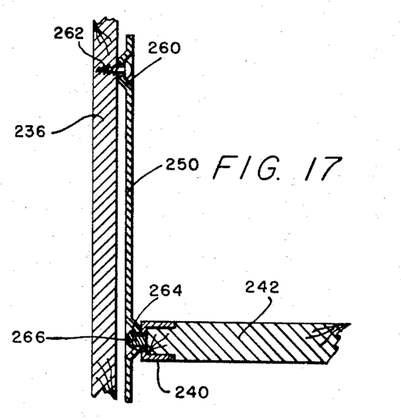
FIGURE 17 is an enlarged sectional detail view taken upon the plane of the section line 17—17 in FIGURE 14.
Figure 18:
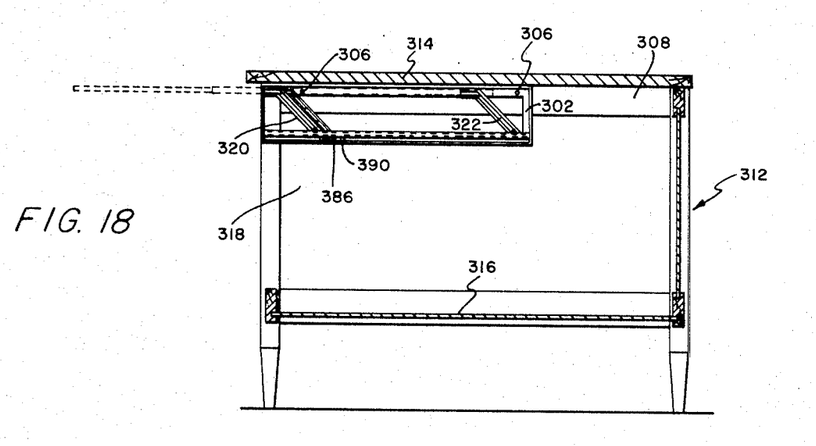
FIGURE 18 is a vertical sectional view through a desk having yet another support assembly modification mounted therein, this view showing the support in full lines in its retracted position, and showing in dashed outline the support in its uppermost operative position with its slide leaf extended.

Whereas the previously described embodiment of the invention employed guide channels and coacting rollers or wheels to define a travel path for the vertically movable support frame, this embodiment of the invention establishes an arcuate travel path for the support frame 240 between a lowermost position thereof shown in full lines in FIGURE 14 to an elevated position thereof indicated in dashed outline that is forwardly and upwardly situated with respect to the retracted position.

Such means for establishing and defining an arcuate travel path for the support frame 240 comprises at each side of the support frame 240 a pair of parallel support links 250 and 252. As will be seen with respect to the support links disposed at the side of the support frame 240 adjacent the wall or partition 236, the upper ends of the support links 250 and 252 are pivotally connected to the wall or partition 236 at the positions designated at 254 and 256. The character of the pivotal connection of the link 250 to the wall 236 (which is representative of all such pivotal connections) is clearly shown in FIGURE 17, wherein it will be seen that the link 250 is provided with an apertured conical depression 260, and a threaded fastener 262 extends through such apertured conical depression 260 and is fixed in the wall 236 to constitute a pivot pin. The lower end of the link 250 is provided with an oppositely directed conical depression 264 that is centrally apertured, and a rivet 266 extends through the apertured conical depression 264 and is fixed to the support frame 240 so as to constitute a pivotal connection. It will be understood that a pair of links corresponding to the described links 250 and 252 are disposed on the side of the support frame 240 adjacent the wall 238 and are similarly pivotally connected intermediate the wall 238 and the support frame 240.

The operation of this embodiment of this invention will be readily understood. The links 250 and 252 occupy the full line positions shown thereof when the support frame 240 is in its lowermost position, and the links will swing to the dashed line positions shown thereof when the support frame 240 is raised to its elevated position. The support frame 240 is manipulated in precisely the same manner as set forth in connection with the previously described embodiment of the invention so as to selectively support or release the support frame 240 at a plurality of different height positions.

The embodiment of the invention shown in FIGURES 14 through 17 can employ spring means such as those indicated at 124 and 126, or can employ a tension spring 270 entrained over a pulley 272 fixed to the desk and having its opposite ends secured respectively at 274 and 276 to the desk 230 and to the rear end of the support frame 240.

Preferably, the support links 250 and 252 are made of heavy sheet metal and are formed by stamping operations. It will be evident that the same choice of materials can be made with respect to the other components of construction of this embodiment of the invention as has been set forth with respect to the other embodiments of the invention.

Attention is now directed to a still further embodiment of the invention illustrated in FIGURES 18 through 26, this embodiment exemplifying a variation of the ratchet and bypass means for selectively positioning and releasing a support on appropriate movement of a support shown in the embodiments of FIGURES 5 through 16.

The reference numeral 300 designates generally a support assembly, the same including spaced, vertical parallel side frames 302 and 304. The frames 302 and 304 are mounted by fasteners such as those shown at 306 to desk frame members 308 and 310, respectively, of a desk designated generally at 312. The frames 302 and 304 are open and of rigid metallic construction, and are preferably disposed in close proximity to the underside of the top 314 of the desk 312, whereby the frames 302 and 304 are spaced substantially above a bottom wall or panel 316 of the desk 312, thereby providing or leaving available a large volume of storage space 318 within the desk 312 between the assembly 300 and the wall 316. It will become apparent that the overall vertical height of the assembly 300 need only exceed in vertical height by a small amount the vertical height of the typewriter (not shown) or that of such other office equipment which may be supported on the assembly 300. This advantage of small assembly height requirements as well as that of large storage volume thereunder is of course shared by the embodiment of the invention shown in FIGURES 1 through 4, and the assembly 300 differs primarily from the previously described assembly 10 in the additional provision of ratchet means for affording a choice in the vertical height of the supported position of the support.

Figures 22, 26:
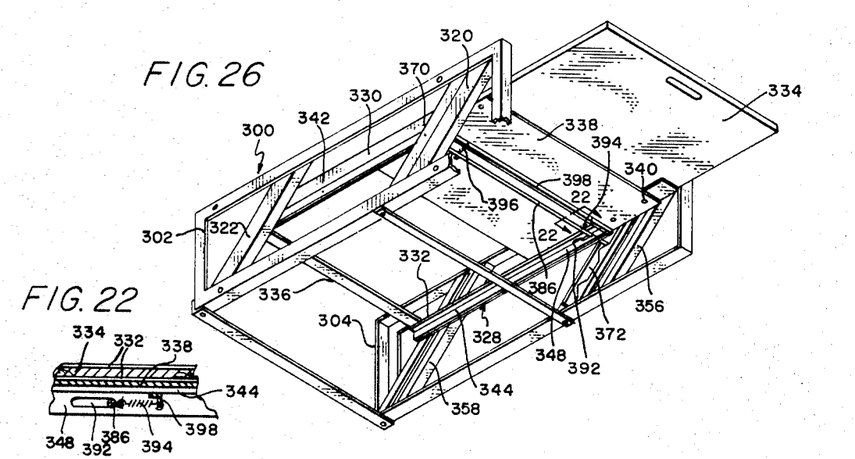
FIGURE 22 is an enlarged vertical sectional detail view taken on the plane of the section line 22—22 in FIGURE 26 illustrating the resilient and movable mounting of the ratchet bar on the support.
FIGURE 26 is an isometric view from the underside of the support assembly shown in FIGURES 18 through 25, this view showing the support secured at an intermediate height adjustment with the slide leaf partially extended.

The assembly 300 includes forward and rear guides 320 and 322 fixed to the side frame 302, and as will be seen quite clearly on inspection of FIGURE 22, such guide channels or guides 320 and 322 are inclined upwardly and forwardly, and at their upper extremities include horizontal forward extensions 324 and 326. Such extensions 324 and 326 can be horizontal as shown, or if desired can be forwardly and downwardly inclined as are the channel portions 32 and 34 of the support assembly embodiment indicated at 10 in FIGURE 1. It is, of course, important that the extensions 324 and 326 are not forwardly and upwardly inclined.

The support assembly 300 includes a support frame comprised of side channel members 330 and 332 between which is guidingly and supportingly received a slide leaf 334. The support frame 328 includes a cross member 336 disposed below and rigidly connecting the rear ends of the side members 332. The frame 328 additionally includes a metallic plate 338 underlying the forward end portions of the members 330 and 332 and is attached thereto by fasteners such as those shown at 340. A pair of elongated metallic angle members 342 and 344 are disposed below the side members 330 and 332, and are fixedly secured to the cross member 336 and the plate 338. As emphasized in FIGURE 22 with respect to the angle member 344, both the angle members 342 and 344 include downwardly extending webs or flanges 348. The flanges 348 serve to reinforce the structure of the support frame 328, and serve yet another function presently to be described.

Figure 25:
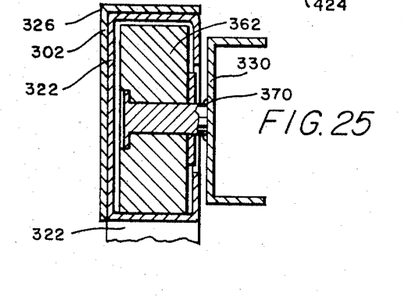
FIGURE 25 is an enlarged sectional detail view of one of the guide channels and a guided roller therein.

The side frame 304 of the support assembly 300 has attached thereto a pair of guides 356 and 358 that are mirror images of the previously described guide channels 320 and 322, respectively, and the side members 330 and 332 have rotatably mounted thereon four rollers for respective coaction with the channel guides 320, 322, 356 and 358, the rollers associated with the channel guides 320 and 322 being designated respectively at 360 and 362, it being understood that the rollers 360 and 362 are mounted on the frame channel member 330 and that a corresponding pair of rollers is mounted on the channel member 332. As best shown in FIGURE 25, the guide channel 322 is C-shaped in section, and the roller 362 is guidingly and rollingly supported in such channel 322, the roller 362 being mounted on a shaft 370 that is fixedly secured to the channel member 330. It will be understood by those skilled in the art that the other guide channels are similar to the guide channel 22 and bear the same relationship to the rollers disposed therein.

As thus far described, it will be evident that the relationship of the guide channels 320, 322, 358 and 356 to the rollers 360 and 362 is such that the support frame 328 is maintained in a horizontal attitude at all times and is guided for straight motion from a retracted lowermost position upwardly and forwardly and thence forwardly in a horizontal direction for a short interval. The arrangement is such that the support frame 328 is supported directly by the forward extensions of the guide channels when the rollers are disposed in such forward horizontal extensions of the guide channels as in the case of the embodiment of the invention illustrated in FIGURES 1 through 4. It is again pointed out that the forward extensions of the guide channels such as indicated at 324 and 326 can be inclined forwardly and downwardly and provided with suitable stop (not shown) at their forward ends so that the support frame 328 will remain disposed in its forwardmost and operative position until a definite upward and rearward force is applied thereto sufficient to return the rollers to the straight and upwardly and forwardly inclined portions of the channel members.

Accordingly, the embodiment of the invention shown in FIGURES 18 through 26 as thus far described is essentially the same as the previously described embodiment of the invention illustrated in FIGURES 1 through 4.

Figure 21:
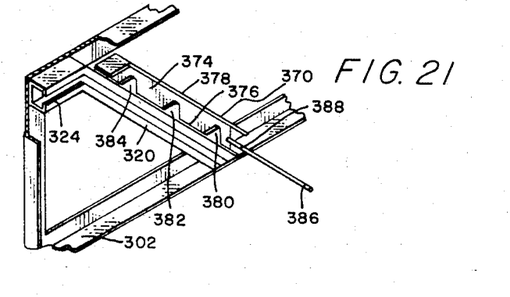
FIGURE 21 is a fragmentary isometric view illustrating particularly the relationship of the toothed member and the ratchet element of the ratchet means and the structure enabling the ratchet element to bypass engagement of the toothed member on lowering the latter with the support.

Whereas the embodiment of the invention illustrated in FIGURES 1 through 4 affords only a single operative position of support for a typewriter, or the like, the embodiment of the invention now being described includes provision for affording a plurality of choices as to operative positions, each of which operative positions differs in vertical height. Such means comprises a pair of metallic channel members 370 and 372 fixed to the side frames 302 and 304 respectively in proximity to and in parallelism with the upwardly and forwardly inclined portions of the channel guides 320 and 356, respectively. As will be seen presently, the channels 370 and 372 are identical, that is, they are mirror images of each other, and accordingly, a detailed description of the channel 370 will suffice for both. As best shown in FIGURE 21, the channel 370 comprises a web 374 that extends between and is integral with flanges 376 and 378 that extend toward the support frame 328, but which are spaced from the latter to afford ample working clearance. The lower most flange 376 of such flanges is provided along its edge most remote from the web 374 with a plurality of longitudinally spaced teeth 380, 382 and 384, thereby constituting the channel 370 as an elongated toothed member, having teeth spaced along and in parallelism with the path of the upwardly and forwardly inclined portion of the channel guide 320. The teeth 380, 382 and 384 are identical to each other and, of course, occupy positions of differing relative height. As readily apparent upon inspection of FIGURES 21 and 23, each of the teeth has an upper edge substantially perpendicular to the inclination of the channel 370 and a lower edge of substantially less slope relative to the inclination of the channel 370, whereby the teeth constitute ratchet teeth arranged to oppose downward movement of an object thereover, but permitting upward ratcheting movement thereover.

An elongated ratchet element or bar 386 is carried by the support frame 328, the ratchet bar 386 having a length greater than the transverse extent of the support frame 328 and the opposite end portions of the ratchet bar 386, such as the end portion 388 project into the channels 370 and 372 so as to coact with the ratchet teeth 380, 382 and 384. The means for movably mounting the ratchet bar 386 on the support frame 328 comprises the previously mentioned depending flanges 346 and 348 being provided with elongated similar slots 392 therethrough, such slots 392 receiving the ratchet bar or rod 386 therethrough, the arrangement being such that the ratchet bar 386 will reciprocate in the slots 392 when the ratchet bar 386 ratchets over the ratchet teeth 380, 382 and 384.

Spring means is provided for urging movement of the latch bar 386 in the slots 390 and 392 towards the flanges 376 of the channels 370 and 372, that is, in a direction such as to urge engagement of the ratchet bar 386 with the ratchet teeth 380, 382 and 384 of the channels 370 and 372. Such spring means comprise a pair of coiled tension springs 394 and 396 disposed adjacent the flanges 348 and 346 and biased between the ratchet bar 386 and the horizontal portions of the angles 342 and 344. The springs 394 and 396 each have one end secured by eyes 400 on the ratchet bar 386 and each have their other end connected to an angle fixed to and extending between the angles 342 and 344.

Figure 19:
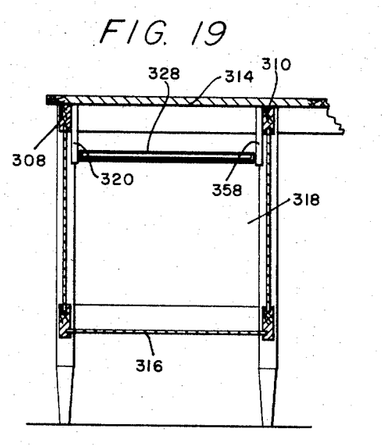
FIGURES 19 and 20 are transverse vertical sectional views respectively showing the support structure of FIGURE 18 retracted and operatively positioned.
Figure 20:
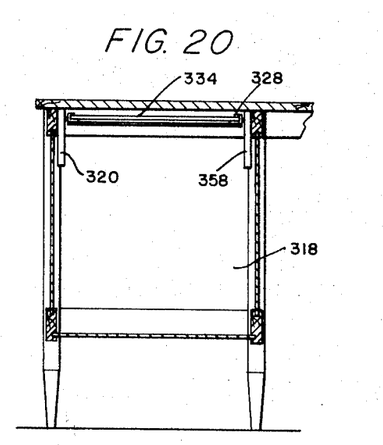

As thus far described, it will be appreciated that as the support frame 338 is moved upwardly from the lowered or retracted position shown thereof in full lines in FIGURE 19, the ratchet bar 386 will have its opposite end portions 388 ratchet up over the teeth 380, 382 and 384 in sequence; however, if the upward movement of the support frame 328 is discontinued at such a time that the ratchet bar 386 is intermediate the teeth 380 and 382, subsequent downward movement of the support frame 328 will result in the opposite end portions of the ratchet bar 386 resting against the upper edges of the teeth 380 in such a manner as to support the support frame 328 against further downward movement. In other words, the support frame 328 can be vertically supported selectively in a plurality of positions of differing vertical heights by selective engagement of the ratchet bar 386 with the teeth 380, 382 and 384, and such selectivity is, of course, obtained upon appropriate manipulation of the support frame 328 along its guided path. It is to be noted that such plurality of selectable positions of height adjustment afforded for the support frame 328 by virtue of the ratchet teeth is in addition to the still higher position of adjustment corresponding to the support or guide rollers being disposed in the forward horizontal extents of the guide channels. Means is provided that operates in response to appropriate manipulation of the support frame 328 to enable the support frame 328 to be lowered to its retracted position, and this, of course, entails the provision of structure enabling the ratchet bar 386 to bypass the teeth 384, 382 and 380 during downward movement of the support frame 328. Such bypass means comprises the upper end of the uppermost flange 378 of both the channels 370 and 372 having attached thereto a leaf spring such as indicated at 404 in connection with the channel 370. The leaf spring 404 has its free end directed toward the lowermost flange 376 in an arrangement such as to be disposed in the travel path of the end portion 388 of the ratchet bar 386.

Figure 23:
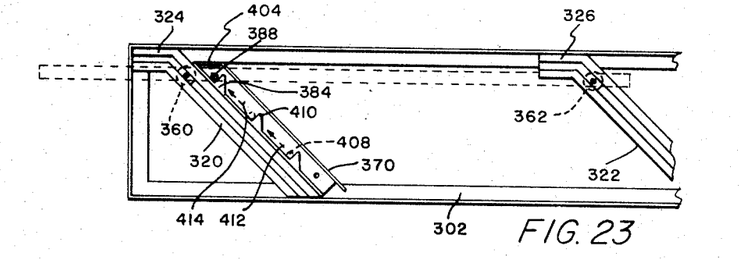
FIGURES 23 and 24 are fragmentary side elevations illustrating particularly the cyclical motion of the ratchet element with respect to the toothed member and the bypass means.
Figure 24:
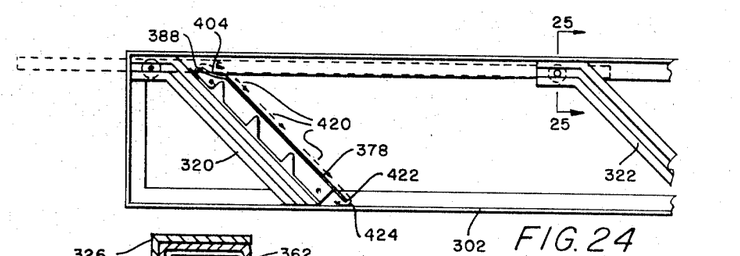

The operation of the bypass means will be readily understood upon consideration of FIGURES 23 and 24. The end portion 388 of the ratchet bar 386 is shown in full lines as in ratchet engagement with the uppermost tooth 384, the same having successively previously passed through the dashed positions shown thereof at 408 and 410 as indicated by the dashed arrows 412 and 414. In order to bypass the teeth 384, 382 and 380 so that the support frame 328 can be lowered, the support frame 328 is manipulated so as to be raised along its travel path so as to bring the ratchet bar portion 388 into engagement with the underside of the free end of the spring 404 so as to flex the same upwardly from the position shown in FIGURE 23 to the position shown in 24 (the ratchet bar portion 388 being shown in full lines in FIGURE 24 in such a position), and upon slight additional further upward movement of the support frame 328, the leaf spring 404 snaps back to its position of repose shown in FIGURE 23, and thereafter the support frame 328 is lowered (or if desired, moved forwardly to the highest position of adjustment), whereupon the ratchet bar portion 388 is deflected rearwardly over the top of the leaf spring 404 and onto the uppermost surface of the uppermost flange 378, such deflection of the latch bar portion 388 serving to compress the springs 394 and 396, such springs remaining compressed throughout downward travel of the end portion 388 along the guided path thereof indicated by the dashed arrows 320 until such time as the ratchet bar portion 388 clears the lower end of the upper flange or bypass element 378 and moves forwardly as indicated by the curved arrow 424 so as to be restored to a position intermediate the flanges 372 and 374. It will be understood that the spring leaf 404 is of sufficient spring strength to effect its deflection function and the compression of the coiled springs, and is yet kept to a minimum value consistent with such requirement so as to not impose excessive resistance to upward movement of the ratchet bar 386 thereby. It will be understood, of course, that bypass means at each of the opposite ends of the ratchet bar 386 are identical in the sense of being mirror images and that the opposite end portions thereof move in unison throughout the cycle of movement thereof indicated in FIGURES 23 and 24.

Figure 6:
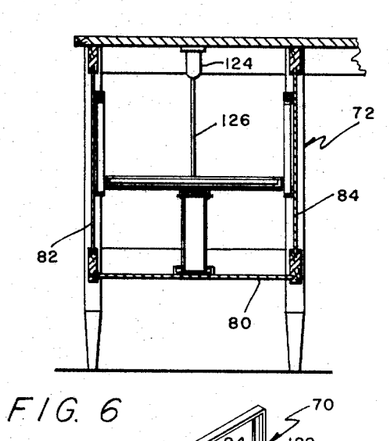
FIGURE 6 is a vertical sectional view taken upon the plane of the section line 6—6 in FIGURE 5.
Figure 7:
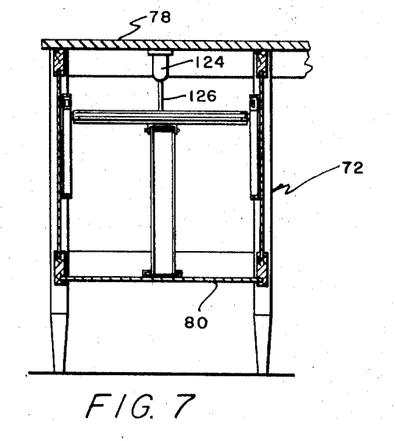
FIGURE 7 is a view similar to that of FIGURE 6, except showing the support in an elevated position.

As in the case of each of the embodiments of the invention illustrated and described, the embodiment of the invention shown in FIGURES 18 through 26 can be provided with spring means of any suitable character and which may be such as disclosed in FIGURES 5 and 6 for yieldingly supporting or yieldingly urging upward movement of the support frame 328.

It will be appreciated in the light of the previous descriptions of other embodiments of the invention that the support leaf 334 permits support for a typewriter as far forwardly of the desk 312 as may be practically desirable. The support leaf 334 in the usual use of the apparatus is extended at all times except when the support frame 328 is in its retracted position shown in full lines in FIGURE 18.

It will be abundantly clear to those familiar with the art to which this invention pertains that numerous variations and departures can be made with respect to the preferred illustrated embodiments of the invention without loss of the benefits of the described principles of operation. Therefore, in view of the fact that the illustrated and described embodiments of the invention are susceptible to many changes without departing from the spirit of the invention, reference must therefore be made to the appended claims in order to ascertain the actual scope of the invention.

I claim:

1. Retractable support apparatus comprising a generally rectangular support in a horizontal attitude and having opposite sides and front and rear ends, said support being movable and provided with means at its opposite sides that are adapted to be secured to a desk for defining a path and guiding movement of said support along such path intermediate first and second locations while maintaining the support in a horizontal attitude, said second location being higher and forward of said first location, said path being of a limited extent and having opposite ends corresponding to the first and second locations of the support, means selectively operable in response to predetermined positioning movements of the support along the path to prevent gravitational movement of the support along said path from adjacent said second location toward the first location, said path including an extent corresponding to the support being relatively nearer its second location as compared to its first location, said extent of the path being forwardly and downwardly inclined, said means for guiding movement and said selectively operable means being jointly comprised of a pair of guides disposed on each of the opposite sides of the support and adapted to be secured to a desk, each guide having contiguous first and second extents, each of such extents having first and second ends, the first end of the first extent being lower and rearwardly of the second end thereof, said first end of the second extent coinciding with the second end of the first extent, and the second end of the second extent being forward of the first end thereof and having a vertical position intermediate those of the first and second ends of the first extent, the guides of each pair thereof being parallelly spaced forwardly and rearwardly of each other, and a pair of forwardly and rearwardly spaced guided elements fixed to each of the opposite sides of the support, the guided elements of each pair thereof being respectively in operative guided relation with each pair of the guides, whereby the support is guided for movement from its first location to its second location so as to pass through an intermediate position of greater height than that corresponding to that of either of the locations.

2. The combination of claim 1, wherein each guide is provided with a guide slot, such guide slot having in transverse section an undercut configuration to constitute a relatively enlarged inner slot portion having a relatively smaller outer slot portion constituting a restricted lateral entrance into the larger inner slot portion, each of said guide elements being movably received in a guide slot, with such guide element projecting from the support and terminating in a relatively enlarged end portion larger than the restricted entrance and disposed in the inner slot portion.

3. The combination of claim 2, wherein the enlarged end portion of the guide element is a wheel rotatably mounted on the support.

4. The combination of claim 1, wherein the support is provided with a slidable extension, with means for securing the extension to and for guiding the same for horizontal movement relative to the support in forwardly and rearwardly directions between extended and retracted positions.

5. Retractable support apparatus comprising a generally rectangular support in a horizontal attitude and having opposite sides and front and rear ends, said support being movable and provided with means at its opposite sides that are adapted to be secured to a desk for defining a path and guiding movement of said support along such path intermediate first and second locations while maintaining the support in a horizontal attitude, said second location being higher and forward of said first location, said path being of a limited extent and having opposite ends corresponding to the first and second locations of the support, means selectively operable in response to predetermined positioning movements of the support along the path to prevent gravitational movement of the support along said path from adjacent said second location toward the first location, the means selectively operable to prevent gravitational movement of the support comprising releasable strut means having first and second ends respectively provided with first and second connecting means, said first connecting means operatively connecting the strut means to the support, said second connecting means being adapted to be secured to a desk at a position below and to the rear of the first connecting means when the support is in its second location, one of said connecting means including a pivot having a horizontal and laterally extending axis about which the strut means swings, and the other of said connecting means comprising first and second means movable relative to each other in first and second directions in response, respectively, to movement of the support along said path towards and away from the second location thereof, said first means comprising a securing element, said second means defining a guide path for the securing element that includes vertically spaced first and second portions each of which is approximately parallel to the direction of relative movement of the first and second means, with said first and second portions of the guide path each having first and second ends respectively connecting with each other, said second means also including means for preventing relative movement of the securing element in said second direction along the first portion of the guide path.

6. The combination of claim 5, wherein said first direction of movement corresponds to the direction that the second end of the first portion of the guide path bears from the first end thereof, and said second means additionally including means for preventing direct travel of the securing element from the second end of the second portion of the guide path to the directly connecting second end of the first portion of the guide path.

7. The combination of claim 6, wherein said means for preventing direct travel comprises a spring member disposed in the guide path at the juncture of the second

17 ends of the first and second portions of such guide path.

8. The combination of claim 5, wherein said means for preventing relative movement comprises the latter having a notch therein that is inclined to and opens to the first portion of the guide path, said securing element being receivable in the notch.

9. The combination of claim 5, wherein said means for preventing relative movement comprises the latter having a plurality of notches therein that are inclined to and which open to the first portion of the guide, said notches being spaced along the extent of said first portion of the guide path.

10. The combination of claim 5, wherein the support is provided with a slidable extension, with means for securing the extension to and for guiding the same for horizontal movement relative to the support in forwardly and rearwardly directions between extended and retracted positions, and wherein the means provided at the opposite sides of the support for defining a path comprises a pair of links pivotally connected at each side of the support, with each link having a free end adapted to be pivotally connected to a desk.

11. The combination of claim 10, wherein the support is provided with a slidable extension, with means for securing the extension to and for guiding movement relative to the support in forwardly and rearwardly directions between extended and retracted positions, and wherein the means provided at the opposite sides of the support for defining a path comprises a pair of inclined guides at each of the opposite sides of the support, such inclined guides being adapted to be secured to a desk against movement, and a pair of guided elements secured to the opposite sides of each support in operative guided engagement with the pairs of inclined guides.

12. Retractable support apparatus comprising a generally rectangular support in a horizontal attitude and having opposite sides and front and rear ends, said support being movable and provided with means at its opposite sides that are adapted to be secured to a desk for defining a path and guiding movement of said support along such path intermediate first and second locations while maintaining the support in a horizontal attitude, said second location being higher and forward of said first location, said path being of a limited extent and having opposite ends corresponding to the first and second locations of the support, means selectively operable in response to predetermined positioning movements of the support along the path to prevent gravitational movement of the support along said path from adjacent said second location toward the first location, said last means comprising ratchet means including an elongated toothed member adapted to be fixed to a desk, said toothed member including a series of spaced teeth each of which is successively disposed in a fixed predetermined relation to the support upon the support being incrementally moved along its path from the first position to the second position thereof, said rachet means also including a ratchet element movably mounted on the support for movement into and out of ratchet engagement with the teeth, the arrangement being such that the rachet element will unidirectionally ratchet freely and sequentially over the teeth of the toothed member on movement of the support along its path from the first position to the second position thereof, whereby the support can be selectively secured against movement at selected positions in a direction from its second position toward its first position, and means responsive to the support being moved a predetermined extent toward its second position to cause the ratchet element to bypass all the teeth on subsequent movement of the support toward its first position.

13. The combination of claim 12, wherein the teeth of the toothed member extend upwardly, with the ratchet element being disposed above the toothed member, and wherein the movement of the ratchet element relative

18 to the support has a vertical component, whereby the ratchet element is gravitationally urged toward the toothed member.

14. The combination of claim 12, including spring means carried by the support yieldingly urging movement of the ratchet element toward the toothed member.

15. Retractable support apparatus comprising a generally rectangular support in a horizontal attitude and having opposite sides and front and rear ends, said support being movable and provided with means at its opposite sides that are adapted to be secured to a desk for defining a path and guiding movement of said support along such path intermediate first and second locations while maintaining the support in a horizontal attitude, said second location being higher and forward of said first location, said path being of a limited extent and having opposite ends corresponding to the first and second locations of the support, means selectively operable in response to predetermined positioning movements of the support along the path to prevent gravitational movement of the support along said path from adjacent said second location toward the first location, said means for defining a path including first and second parallel guides at each of the opposite sides of the support, said means for defining a path including inclined first and second parallel guides at each of the opposite sides of the support, and said means for preventing gravitational movement of the support comprising each of the first guides having an elongated toothed member in parallelism therewith and stationary with respect thereto, said toothed members being at the opposite sides of the support, an elongated ratchet bar carried by the support and having opposite end portions operatively associated with the toothed members, with such end portions disposed to contact the teeth of said toothed members, means mounting said bar on the support for limited lateral movement of the bar relative to the support whereby the opposite end portions thereof are movable towards and away from the toothed members, said teeth each having first and second edges with the first edge having a slope arranged, when engaged by the bar to oppose downward movement of the bar, the second edge having a slope, when engaged by the bar, operative to cause camming movement of the bar from the toothed member on upward movement of the bar and means establishing a guide route for the bar to bypass the toothed member, and means operative on reciprocating the support the entire extent of the path thereof to cause the bar to alternately travel along the toothed members in an upward direction and along the guide route in a downward direction, said last recited means including a deflection spring.

16. The combination of claim 15, wherein the last recited means comprises a guide element parallel to and spaced from the toothed member, and said deflection spring being secured to the guide element and having a free end that in respose project towards the toothed member at a position above the uppermost tooth of the latter.

17. The combination of claim 16, wherein the first and second guides each include forwardly extending portions at their upper ends that are free of upward inclination and which define a path for the support disposed above the position of the latter when it is supported by the end portions of the ratchet bar engaging the uppermost teeth of the toothed members.

References Cited

UNITED STATES PATENTS 2,369,069 2/1945 Mowat _____________ 312—29
2,565,845 8/1951 Frederick __________ 312—246

FOREIGN PATENTS 43,714 8/1910 Austria.
44,907 1/1919 Norway.

CASMIR A. NUNBERG, *Primary Examiner.*